United States Patent [19]

Roy et al.

[11] Patent Number: 5,587,324
[45] Date of Patent: Dec. 24, 1996

[54] PROCESS FOR COAL TAR REMEDIATION

[75] Inventors: Timothy A. Roy, Princeton; Carl R. Mackerer, Pennington, both of N.J.; Lawrence Goldstein, Oakland, Calif.

[73] Assignees: Mobil Oil Corporation, Fairfax, Va.; Electric Power Research Institute, Inc., Palo Alto, Calif.

[21] Appl. No.: 306,762

[22] Filed: Sep. 15, 1994

[51] Int. Cl.$^6$ ........................................ A62D 3/00
[52] U.S. Cl. ................ 436/183; 436/139; 436/145; 436/174; 436/64; 588/261
[58] Field of Search ................ 436/60, 63, 64, 436/139, 145, 174, 183; 588/18, 261

[56] References Cited

U.S. PATENT DOCUMENTS

| | | | |
|---|---|---|---|
| 3,836,354 | 9/1974 | Wienert | 75/3 |
| 3,943,213 | 3/1976 | Whittaker et al. | 264/29 |
| 4,334,917 | 6/1982 | Kibby | 75/10 R |
| 5,013,503 | 5/1991 | Jonville et al. | 264/117 |

*Primary Examiner*—James C. Housel
*Assistant Examiner*—Rachel Heather Freed
*Attorney, Agent, or Firm*—Woodcock Washburn Kurtz MacKiewicz & Norris

[57] ABSTRACT

Methods are provided for the remediation of sites containing coal tar compositions that contain polynuclear aromatic compounds. The remediation entails altering the coal tar compositions to substantially decrease the bioavailability of the polynuclear aromatic compounds. The process includes the contacting and blending of the coal tar with petroleum coke for a time sufficient to produce a uniform admixture. The weight ratio of the petroleum coke to coal tar is generally from about 1:1 to about 10:1. Processes are also disclosed for the determination of the proper blending ratio to achieve a necessary level of remediation.

2 Claims, No Drawings

5,587,324

PROCESS FOR COAL TAR REMEDIATION

FIELD OF THE INVENTION

The present invention relates to methods for remediating coal tar contaminated sites. Specifically, the present invention relates to methods for contacting coal tar compositions with petroleum coke to substantially decrease the bioavailability of any polynuclear aromatic compounds found in the coal tar.

BACKGROUND OF THE INVENTION

Coal tar is a generic name given to one of the byproducts formed when coal is distilled to make coke and/or gas. Coal gasification was generally accomplished by any one of three processes: carbonization, water gas, and carburetted water gas. Occasionally, oil was used as the feedstock, but the basic process was similar to that using coal. The carbonization processes, also called coking processes, destructively distill the coal feedstock. Generally, the coal tar produced is differentiated by its mode of production—either a high temperature or low temperature process. High temperature coal tars are the condensation products obtained by the cooling of the gas evolved at processing temperatures of greater than about 700° C. and up to about 1350° C. Typically, temperatures for the low temperature process ranged from about 200° C. to about 700° C. Current production of coal tars world-wide is closely linked with steel production due to the requirement for coke in the steel making process. Estimates for world production of crude coal tars range from about 15–20 million tons. In addition to the current production of coal tar there exists substantial quantities of coal tar waste at various sites. These sites contain the coal tar either in waste vessels or in the form of contaminated soil or water.

Coal tars contain various amounts of hazardous and toxic materials such as polynuclear aromatic (PNA) hydrocarbon compounds. The presence of these PNA compounds creates concerns relating to potential exposures to the coal tar for workers and the population at large. The bioavailability of the coal tar raises issues as to the carcinogens present in the coal tar. Ways for decreasing the bioavailabilty of these PNA compounds found in coal tar are therefore needed.

A need exists to develop a way of reducing the potential bioavailability of the PNA compounds found in a coal tar sample without creating a further waste material. A useful solution would be one in which the energy value of the coal tar could be utilized.

SUMMARY OF THE INVENTION

The present invention provides methods for remediation of coal tar compositions that generally contain polynuclear aromatic (PNA) compounds. The remediation is particularly important in that it effects a reduction of the bioavailability of the PNA compounds found in the coal tar composition. The process can be carried out by contacting and blending the coal tar composition or sample that contains coal tar with petroleum coke. The blending step is conducted for a period of time sufficient to form a uniform admixture. The weight ratio of the petroleum coke to the coal tar is from about 1:1 to about 10:1.

In a preferred embodiment, the coal tar is presented in a liquid state during the blending process, and preferably in a liquid state before the contacting step. The liquid state can be attained by either melting the coal tar or by dissolving the coal tar in an appropriate solvent.

A further process of the claimed invention is for determining the extent of remediation necessary to reduce the bioavailability of the PNA compounds contained within a coal tar composition. The process can be carried out by obtaining a sample of a coal tar composition and experimentally determining dermal flux rates for weight ratios of petroleum coke to coal tar, wherein the weight ratios of petroleum coke to coal tar are from 1:1 to 10:1. A dermally absorbed dose corresponding to each dermal flux rate can then be calculated by means of the equation:

$$DAD = DA \times EF \times ED \times A/(BW \times AT) \qquad (1)$$

where:
DAD=dermally absorbed dose (mg PNA/kg body wt./day)
DA=dose absorbed per exposure (mg PNA/cm$^2$ body/day)
EF=exposure frequency (days/yr)
ED=exposure duration (yr)
A=exposure surface area (cm$^2$ body)
BW=body weight (kg)
AT=average time (days).

Subsequently, various corresponding cancer risks associated with the calculated dermally absorbed doses can be calculated by using equation:

$$\text{Cancer risk} = 1 - e^{-DAD \times Q} \qquad (2)$$

where
Cancer risk=probability of fatality due to exposure
Q=cancer slope factor.

The calculated cancer risk can then be used to determine the weight ratio of petroleum coke to coal tar to adequately remediate the coal tar composition.

DETAILED DESCRIPTION OF THE INVENTION

The present invention provides methods for reducing the bioavailability of coal tar compositions and for the products obtained as a result of performing those methods. Generally, the methods are performed by admixing coal tar with petroleum coke to form a composition in which the coal tar is bound to the coke. In such a way, the bioavailability of the coal tar is greatly reduced.

The term coal tar as used herein refers to the by-products of the destructive distillation of coal, commonly referred to as carbonization or coking. The physical properties and chemical characteristics of a coal tar composition are primarily dependent on the temperature of the carbonization, and to a lesser extent, on the nature of the coal feedstock. Coal tars are usually viscous liquids or semisolids and are generally black in color with a characteristic naphthalene-like odor.

The term coal tar also encompasses the same by-product formed when coke or petroleum materials are either substituted for, or supplemented with, the coal feedstock as conventionally employed in modern manufactured gas plants. Manufactured gas plants use raw materials such as coal, coke, and petroleum oils, in admixture with air and steam at elevated temperatures to produce a raw gas which is used to produce a multitude of hydrocarbon products such as, for example, ammonia products, phenols, naphthalenes, light oils, middle oils, heavy oils, anthracene oils, pitch, and tars. The production of the raw gas also results in the production of by-product residuals. These residuals are generally classified as solids (coal, coke, and ash), hydrocarbons (coal tar, oil tar, lampblack, tar decanter sludge, and a tar/oil/water emulsion), and an aqueous stream. It is the hydrocarbon stream that contains the coal tar, oil tar and lampblack materials that are all within the definition of "coal tars" as used herein for the present application.

Coal tars contain a multitude of organic compounds. Coal tars are generally described as a complex mixture of hydrocarbons, phenols, and heterocyclic oxygen, sulfur, and nitrogen compounds. Various studies have been made to determine what compounds are present, at to what extent, in coal tars. Over 400 different compounds have been identified in coal tars, and it is estimated that up to 10,000 compounds may be present. Table 1 sets forth a list of representative constituents of coal tars produced by high and low temperature processes. The weight percentages are on a dry tar basis. The wider ranges for the high temperature processes reflect the inclusion of values from continuous vertical-retort processes (1000°–1100° C.) with conventional coke ovens for blast furnaces (1250°–1350° C.).

TABLE 1

Typical Coal Tar Constituents

| High Temperature Processes (wt %) | Compound | Low Temperature Processes (wt %) |
| --- | --- | --- |
| .2–.4 | Benzene | .01–.02 |
| .2–.3 | Toluene | .05–.15 |
| .04–.06 | ortho-Xylene | .05–.06 |
| .05–.05 | meta-Xylene | .07–.1 |
| .03–.05 | para-Xylene | .03–.04 |
| .02–.03 | Ethylbenzene | .02–.04 |
| .02–.04 | Styrene | .01–.02 |
| 0.5–1.0 | Phenol | 1.0–1.4 |
| .2–1.3 | ortho-Cresol | 1.1–1.5 |
| .4–1.0 | meta-Cresol | 1–1.8 |
| .2–.9 | para-Cresol | .9–1.5 |
| .5–3.1 | Xylenols | 5.5–6.4 |
| .9–8.1 | High-boiling tar acids | 10–13 |
| 1–3.3 | Naphtha | 3.0–3.6 |
| 3–10.0 | Naphthalene | 0.6–2.0 |
| .5–.7 | α-Methylnaphthalene | .2–.6 |
| .7–1.5 | β-Methylnaphthalene | .2–1.0 |
| .3–1.1 | Acenaphthene | .2–.6 |
| .5–2.0 | Fluorene | .1–.6 |
| .6–1.5 | Diphenylene oxide | .2–.6 |
| .3–1.0 | Anthracene | .06–.32 |
| 1.7–6.3 | Phenanthrene | .03–1.6 |
| .6–1.5 | Carbazole | 0.2–1.3 |
| .7–2.1 | Tar bases | 2.1–2.5 |
| 43–64 | Medium-soft pitch | 26–33 |

The polynuclear aromatic (PNA) hydrocarbon compounds contained within coal tar compositions present a potential health and environmental hazard. The PNA compound profile of a coal tar sample is primarily dependent upon the temperature of the processing and is relatively independent of the starting material. Typical ranges for concentrations of representative PNAs found in high temperature coal tars are shown in Table 2 and for coke-oven tars in Table 3.

TABLE 2

Polynuclear Aromatic Hydrocarbons - Coal Tars

| PNA | Concentration (%) | PNA | Concentration (%) |
| --- | --- | --- | --- |
| Naphthalene | 10 | Benzo[e]pyrene | 0.50 |
| Anthracene | 1.5 | Benzo[a]fluoranthene | 0.30 |
| Phenanthrene | 5.0 | Benzo[b]fluoranthene | 0.30 |
| Pyrene | 2.1 | Benzo[j]fluoranthene | 0.30 |
| Fluoranthene | 3.3 | Benzo[k]fluoranthene | 0.40 |
| Tetracene (naphthacene) | 0.25 | Dibenz[a,j]anthracene | 0.10 |
| Benz[a]anthracene | 0.65 | Dibenz[a,h]anthracene | 0.10 |
| Chrysene | 1.1 | Picene | 0.15 |
| Tripheneylene | 0.13 | Benzo[ghi]perylene | 0.55 |
| Perylene | 0.25 | Anthanthrene | 0.18 |
| Benzo[a]pyrene | 0.55 | Indeno[1,2,3-cd]pyrene | 0.50 |

TABLE 3

Polynuclear Aromatic Hydrocarbons - Coke Oven Tars

| PNA | Concentration (%) |
| --- | --- |
| Naphthalene | 1.0–5.0 |
| Biphenyl | 0.1–1.0 |
| Fluorene | 0.0–1.0 |
| Phenanthrene | 8.7 |
| Anthracene | 5.5 |
| Fluoranthene | 1.0–5.0 |
| Pyrene | 9.9 |
| Chrysene and/or triphenylene | 2.4 |
| Benzo[a]pyrene | 0.4 |
| Benzo[e]pyrene | 0.4 |
| Perylene | 0.1–1.0 |

Coal tars generally can be described as containing volatiles or light oils, middle oils, heavy oils, anthracene oils and pitch. A summary of the coal tar composition produced in a manufactured gas coke plant in terms of these broad classes of constituents is shown in Table 4.

TABLE 4

Major Distillation Fractions of Coal Tar

| | PERCENTAGES BASED UPON ORIGINAL TAR | | |
| --- | --- | --- | --- |
| COAL TAR FRACTIONS | PRIMARY FRACTION | MAJOR SUBFRACTION | INDIVIDUAL COMPOUNDS |
| Light Oil (up to 200° C.) | 5.0 | | |
| Benzene | | | 0.1 |
| Toluene | | | 0.2 |
| Xylene | | | 1.0 |
| Heavy Solvent Naphtha | | | 1.5 |

TABLE 4-continued

Major Distillation Fractions of Coal Tar

PERCENTAGES BASED UPON ORIGINAL TAR

| COAL TAR FRACTIONS | PRIMARY FRACTION | MAJOR SUBFRACTION | INDIVIDUAL COMPOUNDS |
|---|---|---|---|
| Middle Oil (200–250° C.) | 17.0 | | |
| Tar Acids | | 2.5 | |
| Phenol | | | 0.7 |
| Cresol | | | 1.1 |
| Xylenols | | | 0.2 |
| High Tar Acids | | | 0.5 |
| Tar Bases | | 2.0 | |
| Pyridine | | | 0.1 |
| Heavy Bases | | | 1.9 |
| Naphthalene | | 10.9 | |
| Unidentified | | 1.7 | |
| Heavy Oil (250–300° C.) | 7.0 | | |
| Methylnaphthalenes | | | 2.5 |
| Dimethylnaphthalenes | | | 3.4 |
| Acenaphthene | | | 1.4 |
| Unidentified | | | 1.0 |
| Anthracene Oil (300–350° C.) | 9.0 | | |
| Fluorene | | | 1.6 |
| Phenanthrene | | | 4.0 |
| Anthracene | | | 1.1 |
| Carbazole | | | 1.1 |
| Unidentified | | | 1.2 |
| Pitch | 62.0 | | |
| TOTAL | 100.0 | | |

The described coal tar compositions contain various levels of PNAs which can be absorbed by the body, such as via a dermal route or via a mucous membrane route. Various governmental regulations either exist now, or are likely to be enacted, which will regulate the handling of coal tars due to their PNA content with respect to the concern over exposure and the risk of cancer from that exposure. The present invention provides for methods of decreasing the bioavailability of the PNA compounds present in the coal tar compositions by admixing the coal tar compositions with petroleum coke.

Petroleum coke is a solid residue and major by-product left after all valuable liquid and gaseous components have been extracted from crude oil. The world's crude oil supply has a natural carbon:hydrogen ratio that is much higher than needed in refined petroleum products. Therefore, the crude oil is subjected to either hydroprocessing (adding hydrogen) or coking (removing carbon) process steps to bring the carbon:hydrogen ratio in line. Petroleum coke is being produced at higher rates in the United States due primarily to the increased "coking" of residual oil into higher value products since the residual oil is not being used in favor of cleaner natural gas and low-cost coals. Thus, petroleum coke production has risen from below 20 to over 25 million tons per year since 1970.

Petroleum coke has a carbon:hydrogen ratio of at least about 15:1 and generally at least about 20:1, and generally has a fixed carbon content of at least about 70% wt, and usually from about 75–95% wt. The petroleum coke also contains between about 0.5–10% wt. sulfur, 1–15% wt. ash which is primarily vanadium, iron, and nickel. The heat content of the petroleum coke ranges from about 12,000–15,000 BTU/lb.

The petroleum coke is admixed with the coal tar in a sufficient quantity to significantly decrease the absorption and subsequent bioavailability of the PNA compounds. It is believed that by contacting the coal tar with the petroleum coke that the coal tar is adsorbed onto the petroleum coke. The PNA compounds present in the coal tar are then associated with the petroleum coke and their availability for dermal or mucosal transfer and subsequent bioavailability is substantially reduced.

The petroleum coke is admixed with the coal tar in an amount of from about 10:1 to about 1:1, by weight. Preferably the coal tar, if present in the form as a solid, is ground to a weight average particle size of about 0.3 mm to about 10 mm, preferably from about 0.5 to about 5 mm, and the petroleum coke is also ground to the same particle size ranges. Heat can be used during the admixing process to provide better contact between the two materials.

One process for admixing the coal tar and petroleum coke is to prepare the coal tar in a liquid state. This can be accomplished by either heating the coal tar into a molten state or by dissolving it in an appropriate solvent. The petroleum coke is then admixed with the liquid coal tar composition. The petroleum coke can also be admixed with the coal tar prior to the addition of the heat or solvent. The mixing of the components is preferably continued for a time sufficient to provide a homogeneous mixture after which the solvent can be removed or the temperature reduced to produce a solidified bound product.

The present invention also provides for methods of evaluating a waste site containing coal tar as a source of PNA compounds to determine the level of remediation necessary to sufficiently lower the risk of cancer that may exist upon human exposure. Using this process, remediation personnel can predetermine the appropriate mixing ratio of coal tar and petroleum coke.

One process requires that a value be obtained for the PNA dermal flux relative to the coal tar at the contaminated site. This is accomplished by obtaining a sample of the coal tar composition and determining the dermal flux rate. The determination of the dermal flux rate can be carried out for various mix ratios of the coal tar sample to petroleum coke. An example of an experimental procedure that can be used for determining the dermal flux rate is set forth in Example 1. Once the various flux rates are know for the various coal tar:petroleum coke admixtures, the determination of the proper admixture level for that particular coal tar sample can be determined. First, the dermally absorbed dose (DAD) can be determined using equation (1):

$$DAD = DA \times EF \times ED \times A/(BW \times AT) \quad (1)$$

where:
DAD=dermally absorbed dose (mg PNA/kg body wt./day)
DA=dose absorbed per exposure (mg PNA/cm$^2$ body/day)
EF=exposure frequency (days/yr)
ED=exposure duration (yr)
A=exposure surface area (cm$^2$ body)
BW=body weight (kg)
AT=average time (days)

The analysis will generally be conducted under the assumption that the dose absorbed per exposure (DA) can be calculated by utilizing the dermal flux rate (mg PNA/cm$^2$ body/hr) and estimating an exposure time of about 8 hrs/day. The other variables can be determined based upon the particular circumstances of the application, however general values can be used such as EF=350 days/yr; ED=30 yr; A=2000 cm$^2$ (head and hands); BW=70 kg; and AT=70 yr or 25,550 days.

The thus obtained DAD value can be used to derive a quantitative estimate for chronic systemic health effects that may result from exposure to the PNA compounds in the coal tar. The cancer risk can be determined by using equation (2):

$$\text{Cancer risk} = 1 - e^{-DAD \times Q} \quad (2)$$

Cancer risk=probability of fatality due to exposure
Q=cancer slope factor

The cancer slope factor (Q) is a set value defined by the Environmental Protection Agency Integrated Risk Information system (IRIS) database. The cancer risk values can then be expressed in their reciprocals.

Another process requires that the value be obtained for the extent of DNA adduct formation in each of two tissues of laboratory mice fed, for a period of two weeks, various mix ratios of the coal tar sample to petroleum coke. In this process, the amount of the pyrene metabolite 1-OH pyrene is measured in 24 h urine collections taken on the 13th day of feeding. The levels of 1-OH pyrene are taken to indicate the consumption of the coal tar petroleum coke material, and the levels of DNA adducts in the forestomach and lung is taken to represent the bioavailability of the potentially carcinogenic PNAs such as benzo(a)pyrene. The studies are conducted at a dose approximating 2500 ppm (0.10%) total 3–5 ring PNAs in the feed, this level having been shown to result in detectable levels of DNA adducts in coal tars not mixed with petroleum coke.

EXAMPLE 1

Studies were conducted to determine the dermal penetration properties of coal tar compositions admixed with petroleum coke. To facilitate the measurement of skin penetration, the coal tar/coke compositions were enhanced with $^3$H-radiolabelled benzo(a)pyrene (BaP) prior to the study. It has been previously shown that BaP penetration through rat skin is representative of penetration of other PNA compounds (Roy et al., "Evaluating the Percutaneous Absorption of Polynuclear Aromatics Using In Vivo and In Vitro Techniques and Structure Activity Relationships", 1987).

Radiolabelled benzo(a)pyrene (G-$^3$H) was purchased from Amersham Life Science (Arlington Heights, Ill.) with a specific activity of 46 Curies (Ci)/mmol and a radiochemical purity of 95% by HPLC. Petroleum coke, a black powder, and coal tar, a black liquid were also obtained. The 3–7 ring PNA concentration of petroleum coke and coal tar was 1.4% and 41% by weight, respectively.

Coke-coal tar mixtures were prepared by adding the two components (w/w) together with the $^3$H-BaP in 10 ml dichloromethane, followed by removal of the solvent on a rotary evaporator. The resulting mixture was sieved to a particle size of less than 595 µm. Radioactivity in the $^3$H-fortified doses was determined by an extraction method using dichloromethane.

The experiments were performed using abdominal skin from human cadavers (NDRI, Philadelphia, Pa.) under infinite dose conditions. The integrity of human skin sections was evaluated with $^3$H-water before use; only sections exhibiting normal water permeation ($k_p$, 0.01 cm/hr) were accepted for the study.

An aqueous solution of 6% Volpo-20 and 0.01% thimerosal antibacterial agent was used as the receptor fluid. Consoles containing 15mm diameter Franz diffusion cells (Crown Glass, Somerville, N.J.) were used in the experiments. The temperature of the diffusion cell was maintained at 37° C. by attaching the water-jacketed cells to a circulating water bath. Radioactivity in the receptor fluid was counted directly after addition of cocktail.

The 350 µm split-thickness skin was administered with approximately 45 mg of the test material/diffusion cell or 25 mg/cm$^2$ for the 144-hr experiment. Neat coal tar was applied by volume while the coke-coal tar mixtures were weighed and applied evenly on the skin surface. The receptor fluid was sampled 200–400 µl(200 µl in duplicate or 400 µl/single sampling) at 8, 24, 32, 48, 56, 72, 98 and 144 hr post-dose.

Quantitation of radioactivity was performed on a Packard TR2500 liquid scintillation counter following standard operating procedures. External calibration $^3$H-standard quench curve and individual sample quench determination were performed. Results for the in vitro dermal penetration experiments of neat coal tar, 1:1 and 1:9 coal tar:coke mixtures through human skin are summarized in Table 1.1.

Steady-state absorption was observed from 8–144 hr for neat coal tar with only 0.6% of the applied radioactivity penetrating into the receptor fluid over 144 hr. Based on $^3$H-BaP, the corresponding PNA dermal flux rate for neat coal tar was 0.46 µg/cm$^2$/hr. Parallel human skin experiments with 1:1 and 1:9 coal tar-coke mixtures showed flux rates of 7.8×10$^{-2}$ and 8.9×10$^{-4}$ µg/cm$^2$/hr, respectively.

The results from these in vitro experiments showed that the rates of coal tar absorption through human skin were significantly less from 1:1 and 1:9 coal tar-coke mixtures compared to neat coal tar.

In order to assess the petroleum coke matrix effect in the three experiments, the measured dermal flux rates were normalized for the PNA concentrations in the coal tar-coke mixtures. In comparison with neat coal tar, the corresponding flux rates were decreased by three and sixty-eight times for the 1:1 and 1:9 mixtures, respectively.

TABLE 1.1

| | Polynuclear Aromatic Absorption (μg/cm²) | | | | | |
|---|---|---|---|---|---|---|
| Time | Neat Coal Tar | | 1:1 Coal Tar-Coke | | 1:9 Coal Tar-Coke | |
| (hr) | Mean | (SD) | Mean | (SD) | Mean | (SD) |
| 8 | 5.08 | (2.4) | 0.214 | (0.1) | 0.0304 | (.01) |
| 24 | 11.3 | (7.0) | 1.16 | (0.8) | 0.0436 | (.01) |
| 32 | 14.0 | (9.0) | 1.73 | (1.1) | 0.0518 | (0.1) |
| 48 | 21.9 | (14.6) | 3.12 | (1.9) | 0.0672 | (.02) |
| 56 | 26.1 | (17.5) | 3.76 | (2.2) | 0.0764 | (.02) |
| 72 | 34.4 | (23.0) | 5.15 | (3.0) | 0.0883 | (.02) |
| 98 | 45.7 | (28.1) | 7.05 | (4.0) | 0.109 | (.03) |
| 144 | 65.4 | (33.2) | 10.7 | (6.0) | 0.147 | (.04) |

EXAMPLE 2

Studies were conducted to determine the bioavailability from ingesting coal tar admixed with petroleum coke.

CD-1 female mice were fed a diet containing 0.3% wt. petroleum coke, 0.3% wt. coal tar, 0.3% wt. of a blend of 1:1 by wt. coal tar:petroleum coke, or 0.3% wt. of a blend of 1:9 by wt. coal tar:petroleum coke for a duration of six days. The animals were then sacrificed and the amount of 1-OH pyrene and the total amount of DNA adducts in samples of forestomach and lung was determined for each sample using $^{32}p$ postlabeling and thin layer chromatography.

Relative to the amount determined for coal tar alone, the amount of 1-OH pyrene was reduced by 60.4% and 86.8% when the coal tar was mixed with the petroleum coke at the ratios of 1:1 and 1:9, respectively. Adduct levels were reduced by 87% and 94% for lung and forestomach, respectively, for the 1:1 admixture, and were not detected in the 1:9 admixture. The results are shown in Table 2.1.

TABLE 2.1

| | DNA Adducts Deleted | |
|---|---|---|
| | DNA Adducts (p mole/mg DNA) | |
| Material in Diet | Lung | Forestomach |
| 0.3% MGP Residue | 0.3 | 0.012 |
| 0.3% MGP Residue 0.3% Petrleum Coke | 0.05 | 0.001 |
| 0.3% MGP Residue 2.7% Petroleum Coke | <0.001 | <0.001 |

What is claimed is:

1. A method for determining the extent of remediation necessary to reduce the bioavailability of polynuclear aromatic compounds contained within a coal tar composition, comprising:

(a) obtaining a sample of a coal tar composition comprising coal tar;

(b) experimentally determining a plurality of dermal flux rates for a corresponding plurality of ratios of petroleum coke to coal tar, wherein the weight ratios of petroleum coke to coal tar is from 1:1 to 10:1;

(c) calculating a dermally absorbed dose corresponding to each dermal flux rate by means of the equation:

$$DAD = DA \times EF \times ED \times A/(BW \times AT) \qquad (1)$$

where:
   DAD=dermally absorbed dose (mg PNA/kg body wt./day)
   DA=dose absorbed per exposure (mg PNA/cm² body/day)
   EF=exposure frequency (days/yr)
   ED=exposure duration (yr)
   A=exposure surface area (cm² body)
   BW=body weight (kg)
   AT=average time (days);

(d) subsequently calculating various corresponding cancer risks associated with the calculated dermally absorbed doses by using equation:

$$\text{Cancer risk} = 1 - e^{-DAD \times Q} \qquad (2)$$

where
   Cancer risk=probability of fatality due to exposure
   Q=cancer slope factor; and (e) using the calculated cancer risk to determine the weight ratio of petroleum coke to coal tar to adequately remediate the coal tar composition.

2. A method for reducing the bioavailability of polynuclear aromatic compounds contained within a coal tar sample by contacting the coal tar sample with petroleum coke, comprising:

(a) determining an effective and appropriate level of petroleum coke to blend with the coal tar sample comprising:

(1) obtaining a sample of a coal tar composition comprising coal tar;

(2) experimentally determining a plurality of dermal flux rates for a corresponding plurality of ratios of petroleum coke to coal tar, wherein the weight ratios of petroleum coke to coal tar is from 1:1 to 10:1;

(3) calculating a dermally absorbed dose corresponding to each dermal flux rate by means of the equation:

$$DAD = DA \times EF \times ED \times A/(BW \times AT) \qquad (1)$$

where:
   DAD=dermally absorbed dose (mg PNA/kg body wt./day)
   DA=dose absorbed per exposure (mg PNA/cm² body/day)
   EF=exposure frequency (days/yr)
   ED=exposure duration (yr)
   A=exposure surface area (cm² body)
   BW=body weight (kg)
   AT=average time (days);

(4) subsequently calculating various corresponding cancer risks associated with the calculated dermally absorbed doses by using equation:

$$\text{Cancer risk} = 1 - e^{-DAD \times Q} \qquad (2)$$

where
   Cancer risk=probability of fatality due to exposure
   Q=cancer slope factor; and (5) using the calculated cancer risk to determine the weight ratio of petroleum coke to coal tar to adequately remediate the coal tar composition; and (b) blending the coal tar sample with the weight ratio of petroleum coke determined in step (a) for a period of time sufficient to form a uniform admixture.

* * * * *